(12) United States Patent
Doyle et al.

(10) Patent No.: US 7,966,570 B2
(45) Date of Patent: Jun. 21, 2011

(54) GRAPHICAL USER INTERFACE FOR DETAIL-IN-CONTEXT PRESENTATIONS

(75) Inventors: Michael Doyle, Vancouver (CA); Richard Rupp, Burnaby (CA); Garth Shoemaker, Coquitlam (CA); Collette Ostler, West Vancouver (CA)

(73) Assignee: Noregin Assets N.V., L.L.C., Dover, DE (US)

( * ) Notice: Subject to any disclaimer, the term of this patent is extended or adjusted under 35 U.S.C. 154(b) by 368 days.

(21) Appl. No.: 11/673,038

(22) Filed: Feb. 9, 2007

(65) Prior Publication Data

US 2007/0130540 A1    Jun. 7, 2007

Related U.S. Application Data

(63) Continuation of application No. 10/137,648, filed on May 3, 2002, now Pat. No. 7,197,719.

(30) Foreign Application Priority Data

May 3, 2001 (CA) ..................................... 2345803

(51) Int. Cl.
*G06F 3/00* (2006.01)
(52) U.S. Cl. ........ 715/781; 715/800; 715/801; 345/660; 345/661
(58) Field of Classification Search .................. 715/801, 715/781, 800; 345/660, 661
See application file for complete search history.

(56) References Cited

U.S. PATENT DOCUMENTS

| | | |
|---|---|---|
| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |

(Continued)

FOREIGN PATENT DOCUMENTS

CA    2350342    11/2002

(Continued)

OTHER PUBLICATIONS

Carpendale, Marianne S.T., "A Framework for Elastic Presentation Space", (Burnaby, British Columbia: Simon Fraser University, 1999).

(Continued)

*Primary Examiner* — Dennis Bonshock
(74) *Attorney, Agent, or Firm* — McAndrews, Held & Malloy, Ltd.

(57) ABSTRACT

A method for displaying a region of interest within visual information on a display screen of a computer, the region of interest including a focal region and a base region. The method includes the steps of: providing means for selecting at least one parameter for transforming at least one of the region of interest, the focal region, and the base region; selecting the parameter using the means for selecting; transforming the visual information in accordance with a predetermined distortion function and the parameter to produce transformed visual information; and, displaying the transformed visual information on the display screen.

36 Claims, 5 Drawing Sheets

U.S. PATENT DOCUMENTS

| | | |
|---|---|---|
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dorrnink et al. |
| 5,185,667 A | 2/1993 | Zimmerman |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver |
| 6,133,914 A | 10/2000 | Rogers et al. |
| 6,147,709 A | 11/2000 | Martin et al. |
| 6,154,840 A | 11/2000 | Pebly et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfeld |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |

| | | |
|---|---|---|
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 * | 12/2005 | Watanabe ..................... 345/660 |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen et al. |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese et al. |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1 | 3/2004 | Jetha et al. |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle et al. |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0201785 A1 | 8/2010 | Lantin |
| 2010/0208968 A1 | 8/2010 | Shoemaker et al. |
| 2010/0262907 A1 | 10/2010 | Shoemaker et al. |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0 635 779 | 1/1995 |
| EP | 0635779 | 1/1995 |
| EP | 0650144 | 4/1995 |
| EP | 0 816 983 | 1/1998 |
| EP | 0816983 | 7/1998 |
| JP | 4410465 | 2/2010 |

OTHER PUBLICATIONS

Electronic Magnifying Glasses, IBM Technical Disclosure Bulletin, IBM Corp., New York, U.S., vol. 37, No. 3, Mar. 1, 1994.
Robertson, et al., "The Document Lens", (1993),pp. 101-108.
"Non Final OA", U.S. Appl. No. 11/935,222, (Feb. 20, 2009),12 pages.

Carpendale, M.S.T et al., "A Framework for Unifying Presentation Space", *01UIST. Proceedings of the 14th Annual ACM Symposium on User Interface Software and Technology*, Proceedings of UIST '01: ACM Symposium on User Interface Software and Technology, Orlando, FL, USA; XP002249323 2001, New York, NY, USA, ISBN: 1-58113-438-X,(Nov. 14, 2001),pp. 61-70; p. 64.

Ikedo, T "A Realtime Video-Image Mapping User Polygon Rendering Techniques", *IEEE Intl. conf on Ottawa*, ONT, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings,(Jun. 3, 1997),pp. 127-134.

Bouju, A. et al., "Client-Server Architecture for Accessing Multimedia and Geographic Databases within Embedded Systems", *Database and Expert Systems Applications, 1999 Proceedings. Tenth International Workshop on Florence*, Italy Sep. 1-3, 1999, Los Alamitos, CA, USA, *IEEE Comput. Soc*, US. XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology*. abstract figures 3,4,(Nov. 3, 1993),pp. 101-108.

Dursteler, Juan C., "The digital magazine of InfoVis.net", Retrieved from:http://www.infovis.net/printMag.php?num=85&lang=2; (Apr. 22, 2002).

"Presentation for CGDI Workshop", Retrieved from:http://www.geoconnections.org/developersCorner/devCorner_devNetwork/meetings/2002.05.30/IDELIX_CGDI_20020530_dist.pdf, (May 2002).

Kuederle, Oliver "Presentation of Image Sequences: A Detail-in-Context Approach", *Thesis, Simon Fraser University*; (Aug. 2000),pp. 1-3,5-10, 29-31.

Microsoft Corp., "Microsoft Paint", Microsoft Corp.,(1981-1998),Paint 1-14.

Keahey, T. A., "The Generalized Detail-In-Context Problem", *Information Visualization 1998, Proceedings; IEEE Symposium On Research Triangle*, CA, USA; Los Alamitos, CA, USA, *IEEE Comput. Soc*, US; XP010313304; ISBN: 0-8186-9093,(Oct. 19-20, 1998),pp. 44-51, 152.

Carpendale, et al., "3-Dimensional Pliable Surfaces: For the Effective Presentation of Visual Information", *Proceedings of the 8th annual ACM symposium on User interface and software technology*; (Dec. 1995).

Carpendale, M S T et al., "Extending distortion viewing from 2D to 3D", *IEEE Computer Graphics and Applications, IEEE Inc. New York*, US, vol. 17, No. 4; XP000927815, ISSN: 0272-1716. (Jul. 1997),pp. 42-51.

Viega, J et al., "3D magic lenses", *Proceedings of the 9th annual ACM symposium on User interface software and technology; Pub 1996 ACM Press* New York, NY, USA; (1996),51-58.

Cowperthwaite, David J., "Occlusion Resolution Operators for Three-Dimensional Detail-In-Context", Burnaby, British Columbia: Simon Fraser University; (2000).

Carpendale, M.S.T. "A Framework For Elastic Presentation Space", *Thesis Simon Fraser University*, XP001051168; cited in the application, Chapter 3-5; appendix A,B; (Mar. 1999),pp. 1-271.

Carpendale, M.S.T. et al., "Exploring Distinct Aspects of the Distortion Viewing Paradigm", *Technical Report TR 97-08, School of Computer Science*, Simon Fraser University, Burnaby, British Columbia, Canada; (Sep. 1997).

Cowperthwaite, David J., et al., "Visual Access For 3D Data", in *Proceedings of ACM CHI 96 Conference on Human Factors in Computer Systems*, vol. 2 of Short Papers: Alternative Methods of Interaction; (1996),pp. 175-176.

Keahey, T. A., "Visualization of High-Dimensional Clusters Using NonLinear Magnification", *Technical Report LA-UR-98-2776, Los Alamos National Laboratory*; (1998).

Tigges, M. et al., "Generalized Distance Metrics for Implicit Surface Modeling", *Proceedings of the Tenth Western Computer Graphics Symposium*; (Mar. 1999).

Bossen, F. J., "Anisotropic Mesh Generation With Particles", *Technical Report CMU-CS-96-134, CS Dept, Carnegie Mellon University*; (May 1996).

Bossen, F. J., et al., "A Pliant Method For Anisotropic Mesh Generation", *5th Intl. Meshing Roundtable*; (Oct. 1996),pp. 63-74.

Wilson, et al., "Direct Volume Rendering Via 3D Textures", *Technical Report UCSC-CRL-94-19, University of California, Santa Cruz, Jack Baskin School of Engineering*; (Jun. 1994).

Carpendale, M.S.T. "A Framework for Elastic Presentation Space", *PhD thesis, Simon Fraser University*; (1999),pp. 69, 72, 78-83,98-100, 240, and 241.

Keahey, T. A., et al., "Techniques for Non-Linear Magnification Transformations", *Information Visualization '96, Proceedings IEEE Symposium on, San Francisco, CA, Los Alamitos, CA, USA, IEEE Comput. Soc*, US: XP010201943; ISBN: 0-8186-7668-X the whole document,(Oct. 28, 1996),pp. 38-45.

Carpendale, M. Sheelagh T., et al., "3-Dimensional Pliable Surfaces: For the Effective Presentation of Visual Information", UIST '95, *8th Annual Symposium On User Interface Software and Technology, Proceedings of The ACM Symposium on User Interface Software and Technology*, Pittsburgh, PA, *ACM Symposium on User Interface Software and Technology*, New York, (Nov. 14-17, 1995),pp. 217-226.

Tominski, Christian et al., "Fisheye Tree Views and Lenses for Graph Visualization", pp. 1-8.

Keahey, T. A., "Getting Along: Composition of Visualization Paradigms", *Visual Insights, Inc.*; (2001).

Sakamoto, Chikara et al., "Design and Implementation of a Parallel Pthread Library (PPL) with Parallelism and Portability", *Systems and Computers in Japan*, New York, US, vol. 29, No. 2; XP000752780, ISSN: 0882-1666 abstract,(Feb. 1, 1998),pp. 28-35.

Deng, K. et al., "Texture Mapping with a Jacobian-Based Spatially-Variant Filter", *Proceedings 10th Pacific Conference on Computer Graphics and Applications*, Beijing, China, 2002 Los Alamitos, CA, USA, *IEEE Comput. Soc*, USA; XP00224932, ISBN; 0-7695-1784-6 the whole document,(Oct. 9-11, 2002),pp. 460-461.

Welsh, Michelle "Futurewave Software", *Business Wire*; (Nov. 15, 1993).

Lamar, et al., "A Magnification Lens for Interactive Volume Visualization", *ACM*; pp. 1-10.

Fitzmaurice, G. et al., "Tracking Menus", *UIST*; (2003),pp. 71-79.

Stone, et al., "The movable filter as a user interface tool", *Proceedings of CHI ACM*; (1992),pp. 306-312.

Baudisch, P. et al., "Halo: a Technique for Visualizing Off-Screen Locations", *CHI*; (Apr. 5-10, 2003).

Baudisch, P. et al., "Drag-And-Pop: Techniques for Accessing Remote Screen Content on Touch-And-Pen-Operated Systems", *Interact '03*, (2003).

Carpendale, M.S.T. et al., "Making Distortions Comprehensible", *Visual Languages*, Proceedings, 1997 IEEE Symposium on Isle of Capri, Italy, Sep. 23-26, 1997, Los Alamitos, CA, USA, *IEEE Comput. Soc.*, US, Sep. 23, 1997; XP010250566, ISBN: 0-8186-8144-6,(Sep. 23-26, 1997),pp. 36-45.

Ito, Minoru et al., "A Three-Level Checkerboard Pattern (TCP) Projection Method for Curved Surface Measurement", *Pattern Recognition, Pergamon Press Inc.*, Elmsford, N.Y., US vol. 28, No. 1; XP004014030, ISSN 0031-3203,(1995),pp. 27-40.

Keahey, T A., et al., "Nonlinear Magnification Fields", *Information Visualization, 1997, Proceedings, IEEE Symposium on* Phoenix, AZ, USA, Los Alamitos, CA, USA, *IEEE Comput. Soc.*, US; XP010257169; ISBN: 0-8186-8189-6,(Oct. 20-21, 1997),pp. 51-58 and 121.

Rauschenbach, U. "The Rectangular Fish Eye View as an Efficient Method for the Transmission and Display of Large Images", *Image Processing, ICIP 99, Proceedings, 1999 International Conference on*, Kobe, Japan, Oct. 24-28, 1999, Piscataway, NJ, USA, IEEE, US, XP010368852, ISBN 0-7803-5467-2 p. 115, left-hand column—p. 116, paragraph 3, p. 118, paragraph 7.1; (1999),pp. 115-119.

Keahey, T. A., "Nonlinear Magnification", (*Indiana University Computer Science*), (1997).

Watt, et al., "Advanced Animation and Rendering Techniques", (*Addison-Wesley Publishing*), (1992),p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., "Distortion Viewing Techniques for 3-Dimensional Data", *Information Visualization '96, Proceedings IEEE Symposium on* San Francisco, CA, USA, Los Alamitos, CA, USA, IEEE Comput. Soc, US Oct. 28, 1996; XP010201944; ISBN: 0-8186-7668-X,(Oct. 28-29, 1996),pp. 46-53, 119.

Leung, Y. K., et al., "A Review and Taxonomy of Distortion-Oriented Presentation Techniques", *ACM Transactions on Computer-Human Interaction*, 'Online! vol. 1, No. 2, XP002252314; Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau, Germany, (1995),pp. 127-139.

Carpendale, M.S.T. "A Framework for Elastic Presentation Space", http://pages.cpsc.ucalgary.ca/~sheelagh/personal/thesis/, (Nov. 19, 1999).

"Non Final Office Action", U.S. Appl. No. 11/542,120, (Jan. 22, 2009),20 pages.

"Non-Final Office Action", U.S. Appl. No. 11/410,024, (Mar. 11, 2009),35 pages.

"Foreign Office Action", Application Serial No. 2002-536993, (Mar. 11, 2009),2 pages.

"Notice of Allowance", U.S. Appl. No. 11/401,349, (Apr. 17, 2009),35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Non Final Office Action", U.S. Appl. No. 10/705,199, (May 12, 2009),46 pages.

"Non Final Office Action", U.S. Appl. No. 11/541,778, (Jun. 19, 2009),11 pages.

"Non Final Office Action", U.S. Appl. No. 11/410,024, (Jun. 20, 2009),12 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),13 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Restriction Requirement", U.S. Appl. No. 11/935,222, (Aug. 20, 2009),6 pages.

"Advisory Action", U.S. Appl. No. 11/249,493, (Sep. 14, 2009),4 pages.

"Non-Final Office Action", U.S. Appl. No. 12/364,450, (Sep. 30, 2009),10 pages.

Leung, et al., "A Review and taxonomy of distortion-oriented presentation techniques", *ACM Transactions on Computer-Human Interaction*; (1994),pp. 126-160.

Sheelagh, M et al., "3-Dimensional Pliable Surfaces: For the Effective Presentation of Visual Information", *UIST '95. 8th Annual Symposium on User Interface Software and Technology. Proceedings of the ACM Symposium on User Interface Software and Technology*. Pittsburgh, PA; *ACM Symposium on User Interface Software and Technology*, New York; XP000634423; ISBN: 0-89791-709-X, p. 219, right-hand column, line 219—left-hand column, line 220,(Nov. 14-17, 1995), pp. 217-226.

Doyle, et al., "Graphical User Interface for Detail-In-Context Presentations", U.S. Appl. No. 10/137,648, filed May 3, 2002, (May 15, 2002),15 pages.

Carpendale, M. Sheelagh T., et al., "Distortion Viewing Techniques for 3-Dimensional Data", *Information Visualization '96, Proceedings IEEE Symposium On*, San Francisco, CA, USA, Los Alamitos, CA, USA, *IEEE Comput. Soc.*, US, Oct. 28, 1996, XP010201944, ISBN: 0-8186-7668-X,(Oct. 28-29, 1996), pp. 46-53 and 119.

"Advisory Action", U.S. Appl. No. 11/249,493, (Sep. 14, 2009), 4 pages.

"Notice of Allowance", U.S. Appl. No. 10/358,394, (Oct. 8, 2009), 7 pages.

"Final Office Action", U.S. Appl. No. 11/935,222, (Nov. 24, 2009), 8 pages.

"Final Office Action", U.S. Appl. No. 11/541,778, (Dec. 4, 2009), 12 pages.

"Notice of Allowance", U.S. Appl. No. 11/214,886, (Dec. 15, 2009),16 pages.

"BPAI Decision", U.S. Appl. No. 10/682,298, (Dec. 30, 2009),14 pages.

"Notice of Allowance", U.S. Appl. No. 11/410,024, (Jan. 4, 2010), 7 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.

"Notice of Allowance", U.S. Appl. No. 10/705,199, (Mar. 10, 2010), 18 pages.

"Non Final Office Action", U.S. Appl. No. 11/691,686, (Mar. 18, 2010), 17 pages.

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

"Non Final Office Action", U.S. Appl. No. 12/368,263, (Apr. 30, 2010), 8 pages.

"Notice of Allowability", U.S. Appl. No. 12/364,450, (Jun. 18, 2010), 2 pages.

"Non Final Office Action", U.S. Appl. No. 12/388,437, (Jun. 23, 2010), 7 pages.

"Non Final Office Action", U.S. Appl. No. 12/764,724, (Jul. 1, 2010), 20 pages.

"Final Office Action", U.S. Appl. No. 11/691,686, (Sep. 1, 2010), 16 pages.

"Non Final Office Action", U.S. Appl. No. 11/138,979, (Sep. 17, 2010), 11 pages.

"Non Final Office Action", U.S. Appl. No. 11/541,778, (Sep. 29, 2010), 10 pages.

"Non Final Office Action", U.S. Appl. No. 11/695,104, (Oct. 1, 2010), 9 pages.

"Final Office Action", U.S. Appl. No. 11/159,205, (Oct. 6, 2010), 16 pages.

"Non Final Office Action", U.S. Appl. No. 11/236,694, (Oct. 13, 2010), 16 pages.

"Non Final Office Action", U.S. Appl. No. 12/368,267, (Jun. 11, 2010), 12 pages.

Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and*

*Interactive Techniques Proceedings of the 20th annual conference on COmputer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Final Office Action", U.S. Appl. No. 11/691,686, (Nov. 22, 2010), 16 pages.

* cited by examiner

GRAPHICAL USER INTERFACE FOR DETAIL-IN-CONTEXT PRESENTATIONS

This application is a continuation of U.S. patent application Ser. No. 10/137,648, filed May 3, 2002 now U.S. Pat. No. 7,197,719, the disclosure of which is incorporated herein by reference.

This application claims priority from Canadian Patent Application No. 2,345,803, filed May 3, 2001, and incorporated herein by reference.

The invention relates to the field of computer graphics processing, and more specifically to a graphical user interface (GUI) to a detail-in-context presentation system.

BACKGROUND OF THE INVENTION

Display screens are the primary visual display interface to a computer. One problem with these visual display screens is that they are limited in size, thus presenting a challenge to user interface design, particularly when larger amounts of information is to be displayed. This problem is normally referred to as the "screen real estate problem".

Well-known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region") in a data presentation while preserving visibility of the surrounding information. This technique has applicability to the display of large surface area media, such as maps, on limited size computer screens such as personal digital assistance (PDA's) and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space ("EPS") may be found in a publication by Marianne S. T. Carpendale, entitled "A Framework for Elastic Presentation Space" (Burnaby, British Columbia: Simon Fraser University, 1999), and incorporated herein by reference.

Development of increasingly powerful computing devices has lead to new possibilities for applications of detail-in-context viewing. At the same time, the demand for user control over the parameters of a detail-in-context lens has increased. Indeed, one shortcoming of current EPS graphics technology and detail-in-context presentation methods is the lack of an effective user friendly graphical user interface ("GUI") for the control of lens display parameters. Generally, with a GUI, a user interacts with icons and controls in a GUI display by moving a pointing device, such as a mouse, which causes a censor or pointer to be moved on the display. When the pointer is over the displayed icon or control, the user presses a button, such as a mouse button, to invoke one or more operations to be performed by the computer system.

A need therefore exists for a GUI to control one or more features of a detail-in-context display system. Consequently, it is an object of the present invention to obviate or mitigate at least some of the above-mentioned disadvantages.

SUMMARY OF THE INVENTION

According to one aspect of the invention, a method is provided for displaying a region of interest within visual information on a display screen of a computer, the region of interest including a focal region and a base region. The method includes the steps of: providing means for selecting at least one parameter for transforming at least one of the region of interest, the focal region, and the base region; selecting the parameter using the means for selecting; transforming the visual information in accordance with a predetermined distortion function and the parameter to produce transformed visual information; and, displaying the transformed visual information on the display screen.

According to another aspect of the invention, the parameter includes a magnification for the region of interest, a size for the focal region, a size for the base region, a shape for the focal region, a shape for the base region, a location for the base region within the visual information, and a location for the focal region relative to the base region.

According to another aspect of the invention, the means for selecting includes bounding rectangle, handle, crosshairs, and slide bar.

Advantageously, the method of the invention is implemented using user friendly graphical user interface.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

Figure 1:
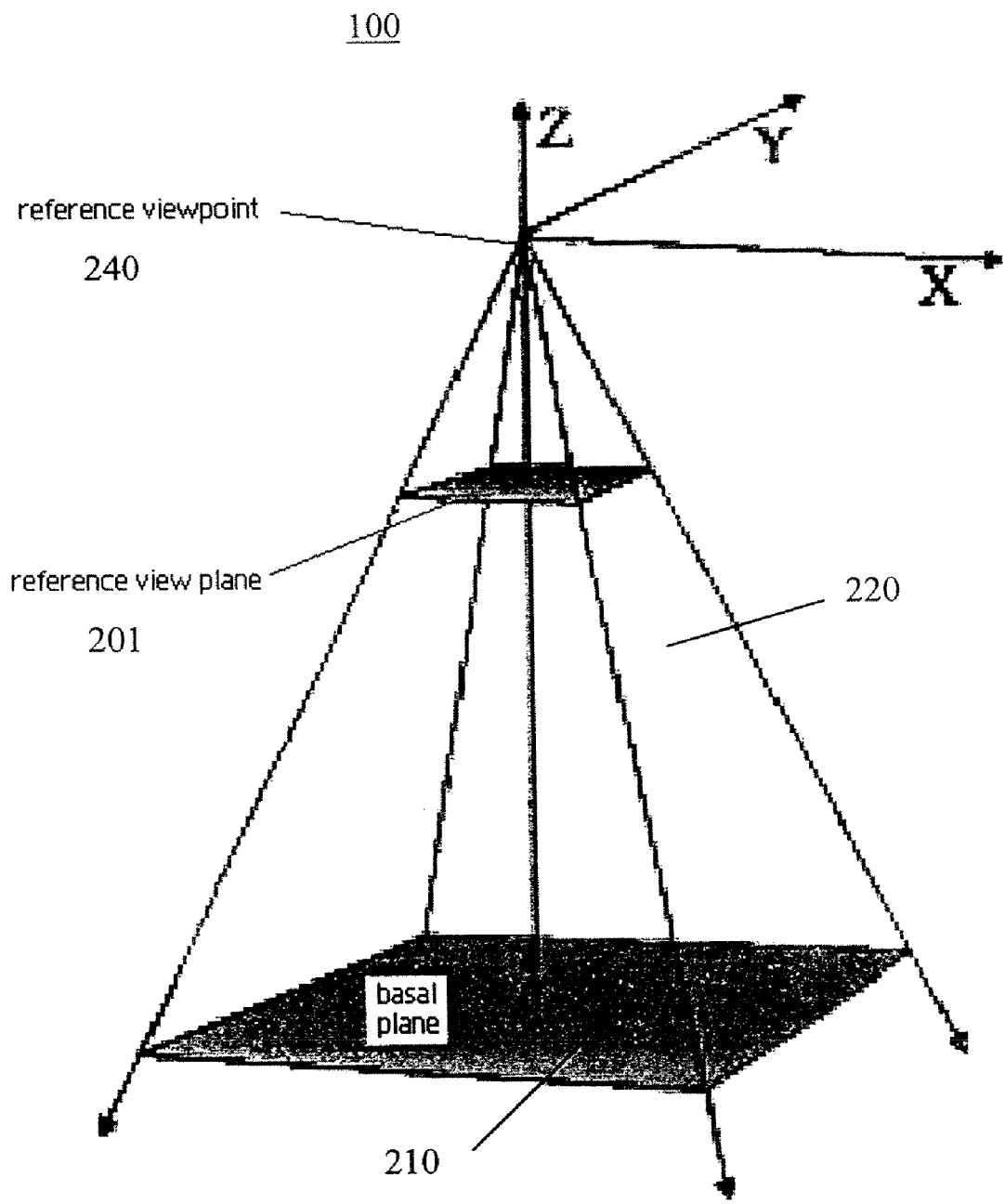
FIG. 1 is a graphical construction illustrating a 3D perspective viewing frustum in accordance with known elastic presentation space graphics technology.

In the following description, numerous specific details are set forth to provide a thorough understanding of the invention.

However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in *A Framework for Elastic Presentation Space* (Carpendale, Marianne S. T., *A Framework for Elastic Presentation Space* (Burnaby, British Columbia: Simon Fraser University, 1999)) which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. In the drawings, like numerals refer to like structures or processes.

Referring to FIG. 1, there is shown a graphical representation 100 of the geometry for constructing a three-dimensional (3D) perspective viewing frustum 220 relative to an x, y, z coordinate system in accordance with known elastic presentation space ("EPS") graphics technology. In the EPS, detail-in-context views of 2D visual representations are created with sight-line aligned distortions of a two-dimensional (2D) information presentation surface within a 3D perspective viewing frustum 220. In EPS, magnification of regions of interest and the accompanying compression of the contextual region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
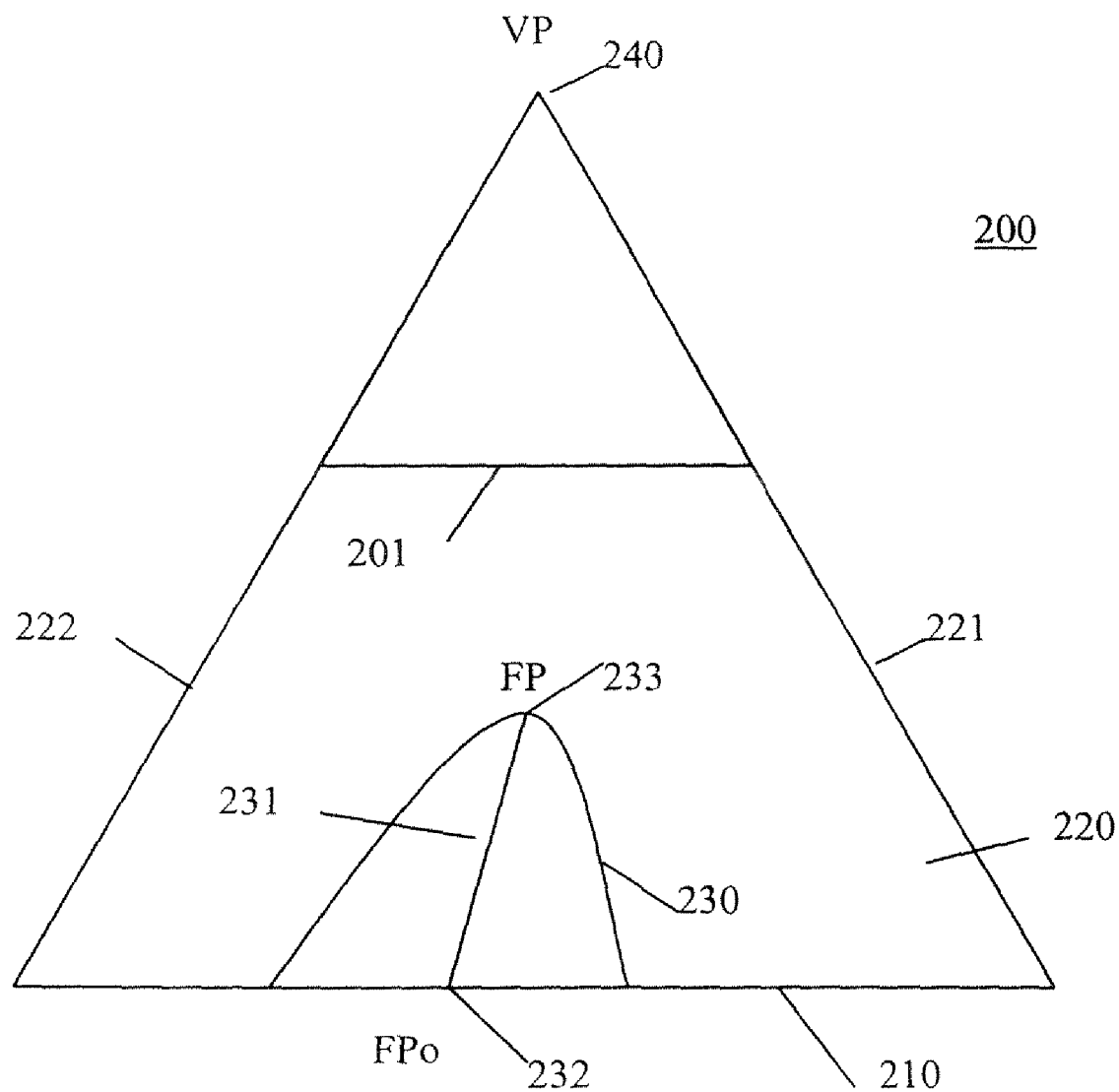
FIG. 2 is a cross-sectional view illustrating a presentation in accordance with known elastic presentation space graphics technology.

Referring to FIG. 2, there is shown geometrical representation of a presentation 200 in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing" and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, the source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
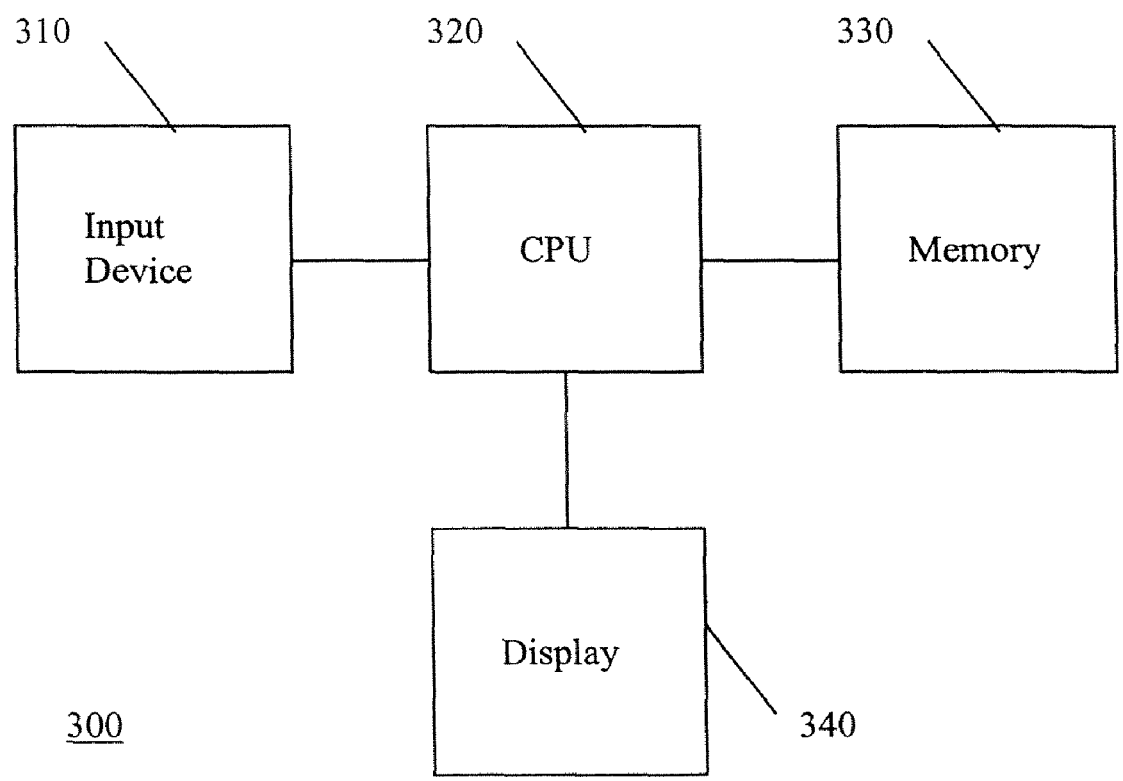
FIG. 3 is a block diagram illustrating an exemplary data processing system for implementing an embodiment of the invention.

System. Referring to FIG. 3, there is shown a block diagram of an exemplary data processing system 300 for implementing an embodiment of the invention. The data processing system is suitable for implementing EPS technology in conjunction with a graphical user interface ("GUI"). The data processing system 300 includes an input device 310, a central processing unit or CPU 320, memory 330, and a display 340. The input device 310 may be a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements. As mentioned, detail-in-context presentations of data using techniques such as pliable surfaces, as described by Carpendale, are useful in presenting large amounts of information on limited-size display surfaces. Detail-in-context views allow magnification of a particular region of interest (the "focal region") 233 in a data presentation while preserving visibility of the surrounding information 210. In the following, a GUI having lens control elements that can be implemented in software and applied to the control of detail-in-context data presentations, including EPS and pliable surfaces, is described. The software can be loaded into and run by the exemplary data processing system 300 of FIG. 3.

Figure 4:
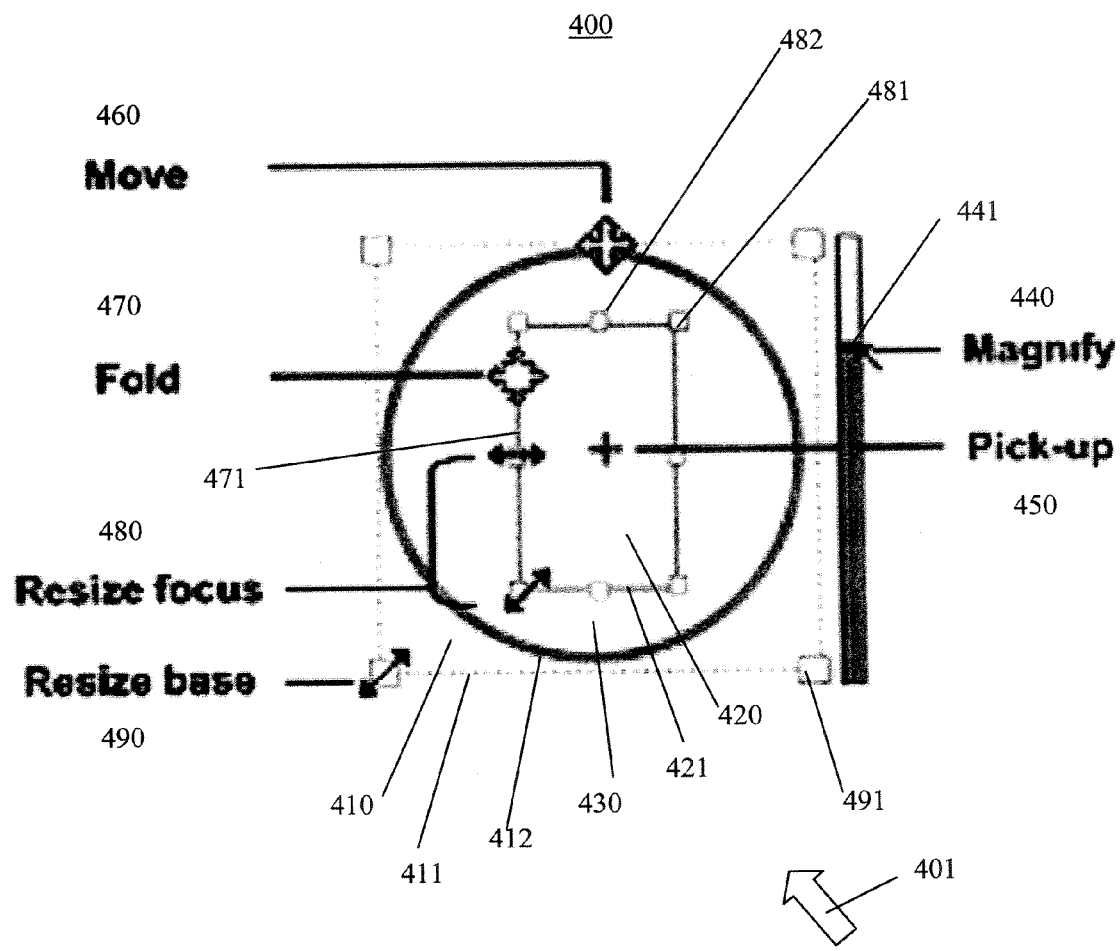
FIG. 4 a partial screen capture illustrating a GUI having lens control elements for user interaction with detail-in-context data presentations in accordance with an embodiment of the invention; and, FIG. 5 is a flow chart illustrating a general method for displaying a region of interest within visual information on a display screen of a computer in accordance with an embodiment of the invention.

Referring to FIG. 4, there is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the "context"), the end result typically giving the appearance of a "lens" having been applied to the display screen surface. This "lens" 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. Referring again to FIG. 2, the lens 410 corresponds to the projection of the distorted surface 230 and focal region 233 onto the reference plane 201.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of a pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 on the display surface 340 (e.g. cursor) to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, and magnify. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, and magnify slide bar icon 440. Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491.

Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Move. Lateral movement of a lens 410 is provided by the move lens control element of the GUI. This functionality is accomplished by the user first selecting the lens 410 through a point and click operation. Then, the user points to a point within the lens 410 that is other than a point lying on a lens control icon 450, 412, 411, 421, 481, 482, 491, 440. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup. Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base. Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus. Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold. Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231.

In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify. Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed.

Typically, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Icon Hiding. Advantageously, a user may choose to hide one or more lens control icons 450, 412, 411, 421, 481, 482, 491, 440 shown in FIG. 4 from view so as not to impede the user's view of the data (i.e. visual information) within the lens 410. This may be helpful, for example, during a move operation. A user may select this option through means such as a menu or lens property dialog box.

Figure 5:
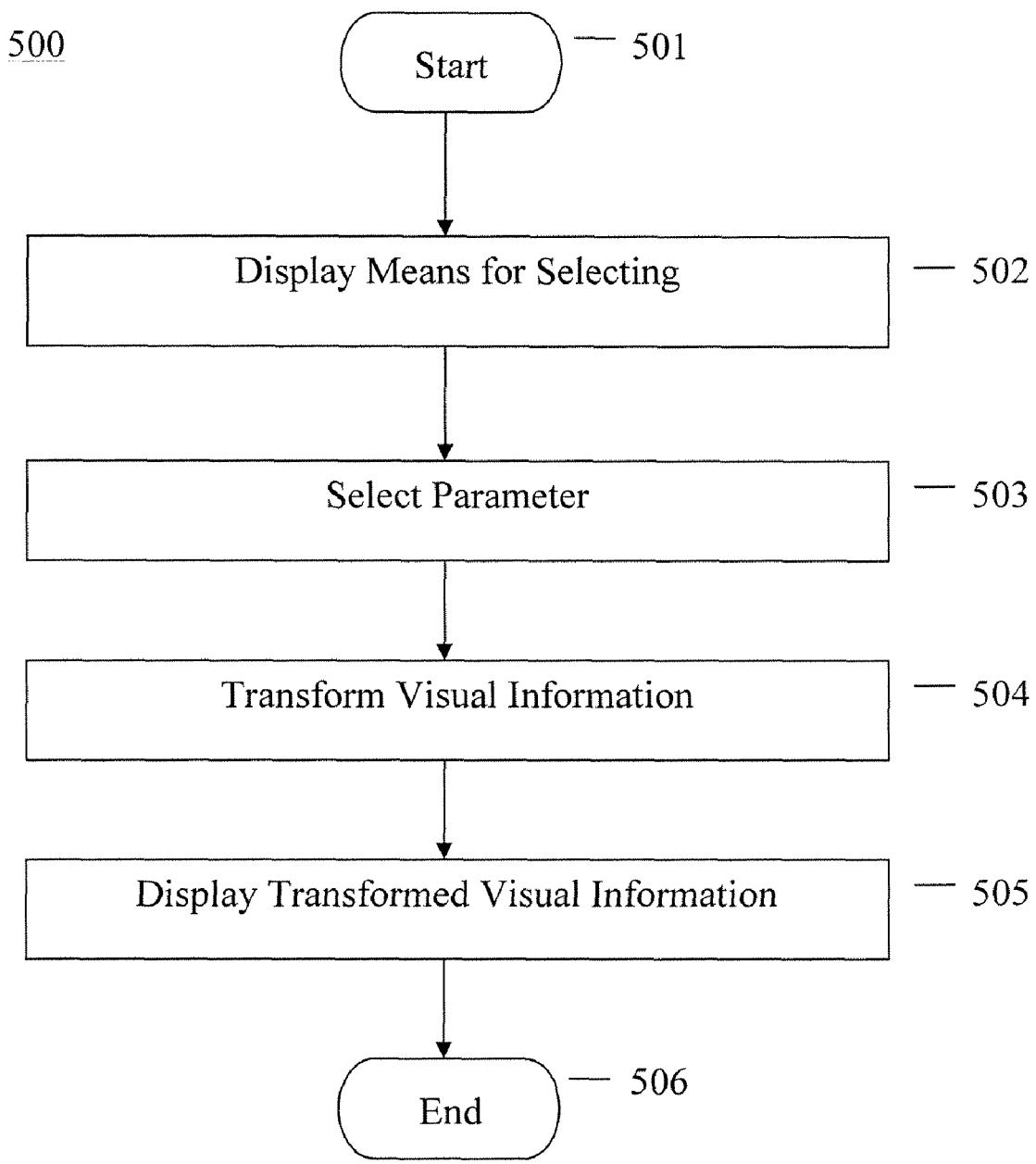

Method. Referring to FIG. 5, there is shown a flow chart 500 illustrating a general method for displaying a region of interest within visual information on a display screen of a computer, the region of interest having a focal region and a base region, in accordance with an embodiment of the invention. At step 501, the method starts. At step 502, means are provided for choosing at least one parameter for transforming at least one of the region of interest, the focal region, and the base region. At step 503, the parameter is selected using the selecting means. At step 504, the visual information is transformed in accordance with a predetermined distortion function and the parameter to produce transformed visual information. At step 505, the transformed visual information is displayed on the display screen. At step 506, the method ends. The selected parameter may include a magnification for the region of interest 410, a size for the focal region 420, a size for the base region 410, a shape for the focal region 420, a shape for the base region 410, a location for the base region within the visual information 450, 460, and a location for the focal region relative to the base region 470. The means for selecting includes slide bars 440 and handles 481, 482, 491, 471, 441.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although the invention has been described with reference to certain specific embodiments, various modifications thereof will be apparent to those skilled in the art without departing from the spirit and scope of the invention as outlined in the claims appended hereto.

What is claimed is:
1. A method comprising:
generating an initial presentation by applying a lens to a region within an original image, the lens having a focal region with a magnification for the region at least partially surrounded by a shoulder region across which the magnification decreases to that of the original image;
receiving one or more signals to adjust the lens through a graphical user interface ("GUI") displayed over the region in the initial presentation, wherein the GUI includes a plurality of lens control elements selectable to adjust both the focal region and the shoulder region; and
outputting an updated presentation for display on a display screen by adjusting the lens in accordance with the one or more signals and applying the adjusted lens to the original image to generate the updated presentation, wherein the plurality of lens control elements includes at least a fold element positioned on a perimeter of the focal region and selectable to adjust a degree and a direction of folding of the lens.
2. The method of claim 1 wherein the magnification is uniform in the focal region.
3. The method of claim 2 wherein the magnification of the shoulder region decreases smoothly to that of the original image.

4. The method of claim 2 wherein the magnification of the shoulder region decreases variably to that of the original image.

5. The method of claim 1 wherein the plurality of lens control elements includes at least one of active areas, icons, and controls.

6. The method of claim 1 wherein the plurality of lens control elements includes at least one active area positioned on the perimeter of the focal region selectable to adjust an extent of the region.

7. The method of claim 6 wherein the at least one active area is at least one handle icon.

8. The method of claim 1 wherein the plurality of lens control elements includes an active area for selecting an amount of the magnification of the focal region.

9. The method of claim 8 wherein the active area is a slide bar icon.

10. The method of claim 1 wherein the plurality of lens control elements includes a lens control element selectable to adjust an extent of the shoulder region.

11. The method of claim 10 wherein the lens control element selectable to adjust the extent of the shoulder region includes at least one active area positioned on a perimeter of the shoulder region.

12. The method of claim 11 wherein the at least one active area is at least one handle icon.

13. The method of claim 1 wherein the plurality of lens control elements includes a lens control element selectable to adjust a location for the lens within the original image.

14. The method of claim 13 wherein the lens control element selectable to adjust a location for the lens within the original image includes at least one active area positioned within at least one of the focal and shoulder regions.

15. The method of claim 13 wherein the lens control element selectable to adjust a location for the lens within the original image includes a cross-hairs icon positioned within the focal region.

16. The original method of claim 1 and further comprising receiving the one or more signals from a pointing device manipulated by a user.

17. The method of claim 1 wherein the lens is a three-dimensional surface defined by a distortion function.

18. The method of claim 17 wherein the applying includes displacing the original image onto the lens and projecting the displaced original image onto a plane.

19. The method of claim 18 wherein the projecting onto the plane is in a direction aligned with a viewpoint for the region.

20. A method comprising:
generating an initial presentation by applying a lens to a region within an original image to produce a distorted region at the region within the original image, the lens having a focal region with a magnification for the region at least partially surrounded by a shoulder region across which the magnification decreases to that of the original image;
receiving one or more signals to adjust the lens through a graphical user interface ("GUI") displayed over the distorted region in the initial presentation, wherein the GUI includes a plurality of lens control elements selectable to adjust both the focal region and the shoulder region, the plurality of lens control elements including at least a fold element positioned on a perimeter of the focal region and selectable to adjust a degree and a direction of folding of the lens;
adjusting the lens with the one or more signals and applying the adjusted lens to the original image to generate an updated presentation; and
outputting the updated presentation.

21. A method comprising:
receiving one or more signals to adjust a lens for a region of an original image through a graphical user interface ("GUI") displayed over the region in a presentation of the original image having a focal region with a magnification for the region at least partially surrounded by a shoulder region across which the magnification decreases to that of the original image, the GUI including a plurality of lens control elements comprising a fold element positioned on a perimeter of the focal region and selectable to adjust a degree and a direction of folding of the lens;
adjusting the focal region and the shoulder region in accordance with the one or more signals to generate an adjusted presentation; and
displaying the adjusted presentation on a display screen.

22. A method comprising:
receiving a selection of a plurality of lens control elements of a graphical user interface ("GUI") displayed over a distorted region of an image generated by applying a lens to the image, the lens having a focal region with a magnification for a portion of the distorted region at least partially surrounded by a shoulder region across which the magnification decreases to that of the undistorted image, wherein the plurality of lens control elements of the GUI includes a fold element selectable to adjust a degree and a direction of folding of the lens;
adjusting the lens in accordance with the received selection to generate an adjusted presentation; and
outputting the adjusted presentation for display on a display screen.

23. One or more computer-readable memories storing instructions that, responsive to execution by a data processing system, cause the data processing system to perform operations comprising:
presenting a graphical user interface (GUI) having:
a portion to present a detailed in-context presentation generated by applying a lens to an original image, the lens having a focal region with a magnification of the original image at least partially surrounded by a shoulder region across which the magnification decreases to that of the original image; and
a plurality of lens control elements selectable to adjust the lens including at least a fold element positioned on a perimeter of the focal region and selectable to adjust a degree and a direction of folding of the lens; and
in response to input received via the one or more lens control elements, generating an update to the detailed in-context presentation by adjusting the lens in accordance with the input and applying the adjusted lens to the original image.

24. One or more computer-readable memories of claim 23 wherein the magnification is uniform in the focal region.

25. One or more computer-readable memories of claim 23 wherein the magnification decreases smoothly in the shoulder region to that of the original image.

26. One or more computer-readable memories of claim 23 wherein the magnification decreases variably within the shoulder region to that of the original image.

27. One or more computer-readable memories of claim 23 wherein the plurality of lens control elements includes one or more active areas, icons, and controls.

28. One or more computer-readable memories of claim 23 wherein the operations further comprise outputting the updated detailed in-context presentation for display via a display device coupled to the data processing system.

29. One or more computer-readable memories of claim 23 wherein the lens is a three-dimensional surface defined by a distortion function.

30. One or more computer-readable memories of claim 23 wherein the applying includes displacing the original image onto the lens and projecting the displaced original image onto a plane.

31. A computing system comprising:
    at least one memory; and
    computer program instructions stored in the at least one memory that, responsive to execution by the computing system, cause the computing system to:
        expose a graphical user interface (GUI) having:
            a portion to present a detailed in-context presentation generated by applying a lens to an original image, the lens having a focal region with a magnification of the original image at least partially surrounded by a shoulder region across which the magnification decreases to that of the original image;
            a plurality of lens control elements selectable to adjust the lens including at least a fold element positioned on a perimeter of the focal region and selectable to adjust a degree and a direction of folding of the lens; and
        in response to input received via one or more of the plurality of lens control elements, generate an update to the detailed in-context presentation by adjusting the lens in accordance with the input and applying the adjusted lens to the original image.

32. The computing system of claim 31 wherein the plurality of lens control elements further includes:
    an element selectable to adjust a location for the lens within the original image;
    an element selectable to adjust an extent of the shoulder region; and
    an element selectable to adjust a location for the focal region relative to the shoulder region.

33. The computing system of claim 31 wherein the plurality of lens control elements are selected from a group consisting of active areas, icons, and controls.

34. The computing system of claim 31 wherein one of the plurality of lens control elements is selectable to adjust the magnification.

35. The computing system of claim 31 wherein one of the plurality of lens control elements is selectable to adjust the magnification of both the focal region and the shoulder region.

36. The computing system of claim 31 further comprising computer program instructions stored in the at least one memory that, if executed by the computing system, cause the computing system to:
    expose an icon corresponding to each of the plurality of lens control elements responsive to a selection of the lens via the graphical user interface.

* * * * *

UNITED STATES PATENT AND TRADEMARK OFFICE
CERTIFICATE OF CORRECTION

PATENT NO.        : 7,966,570 B2
APPLICATION NO.   : 11/673038
DATED             : June 21, 2011
INVENTOR(S)       : Doyle et al.

It is certified that error appears in the above-identified patent and that said Letters Patent is hereby corrected as shown below:

Title Page 5, item (56), under "Other Publications", in Column 1, Line 13, delete "an" and insert -- and --.

Title Page 5, item (56), under "Other Publications", in Column 1, Line 37, delete "(Jun. 20," and insert -- (Jul. 20, --.

Column 1, line 3, below Title insert -- CROSS-REFERENCE TO RELATED APPLICATIONS --.

Column 11, line 10, in Claim 6, delete "region." and insert -- focal region. --.

Column 11, line 40, in Claim 16, delete "original method" and insert -- method --.

Signed and Sealed this
Twenty-fifth Day of October, 2011

David J. Kappos
*Director of the United States Patent and Trademark Office*